(12) United States Patent
Chu et al.

(10) Patent No.: US 9,438,297 B2
(45) Date of Patent: Sep. 6, 2016

(54) PROTECTIVE CASE WITH ELECTRONIC FUNCTION FOR ELECTRONIC DEVICE

(71) Applicant: HON HAI PRECISION INDUSTRY CO., LTD., New Taipei (TW)

(72) Inventors: Chen-Ching Chu, New Taipei (TW); Cheng-Kuo Lee, New Taipei (TW); Yu-Ning Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/797,412

(22) Filed: Jul. 13, 2015

(65) Prior Publication Data
US 2016/0173159 A1 Jun. 16, 2016

(30) Foreign Application Priority Data
Dec. 11, 2014 (CN) .......................... 2014 1 0755384

(51) Int. Cl.
| | |
|---|---|
| H04M 1/00 | (2006.01) |
| H04B 1/3888 | (2015.01) |
| H04W 4/00 | (2009.01) |
| H04M 1/60 | (2006.01) |
| H04B 1/10 | (2006.01) |

(52) U.S. Cl.
CPC ......... *H04B 1/3888* (2013.01); *H04M 1/6058* (2013.01); *H04W 4/008* (2013.01)

(58) Field of Classification Search
CPC . H04B 1/3888; H04B 1/6058; H04B 1/6066
USPC .............................. 455/575.8, 569.1
See application file for complete search history.

(56) References Cited

U.S. PATENT DOCUMENTS

| | | | | |
|---|---|---|---|---|
| 6,978,163 | B2* | 12/2005 | Dyer ...................... | A45C 11/00 370/430 |
| 2013/0113419 | A1* | 5/2013 | Lowles ................. | H02J 7/0044 320/107 |

* cited by examiner

*Primary Examiner* — Lee Nguyen
(74) *Attorney, Agent, or Firm* — Zhigang Ma

(57) ABSTRACT

A protective case for an electronic device includes a PCB and other components and devices. The other components and devices arranged on the case are connected to the PCB, the devices include a battery, a socket configured to accommodate a wireless communication device, a data connector, a wireless communication module, and a control module. The control module controls the battery to charge the electronic device and activates the wireless communication module to connect to the electronic device through the data connector, if the data connector is in use. The wireless communication module is controlled to communicate with the wireless communication device if the wireless communication device is removed from the socket and the battery is controlled to supply power to the wireless communication device if the wireless communication device is inserted into the socket.

8 Claims, 3 Drawing Sheets

| US 9,438,297 B2
1

PROTECTIVE CASE WITH ELECTRONIC FUNCTION FOR ELECTRONIC DEVICE

CROSS-REFERENCE TO RELATED APPLICATIONS

This application claims priority to Chinese Patent Application No. 201410755384.8 filed on Dec. 11, 2014, the contents of which are incorporated by reference herein.

FIELD

The subject matter herein generally relates to electronic functionality.

BACKGROUND

Electronic devices are usually accommodated in protective cases. Peripheral devices such as headphones and a battery can be connected to a protective case.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
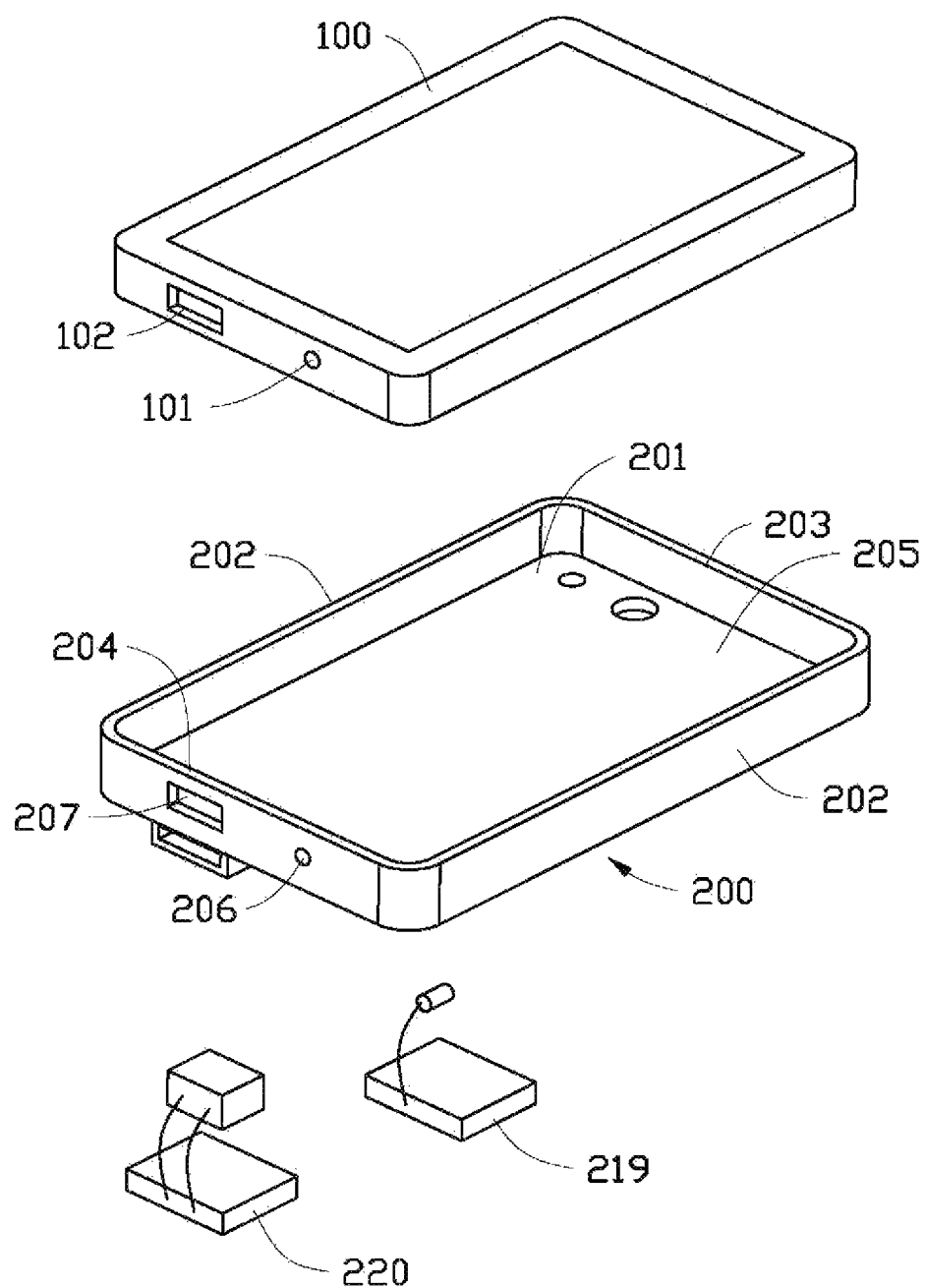
FIG. 1 is an isometric, exploded view of an electronic device and a protective case.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

The present disclosure is described in relation to a protective case for an electronic device. The protective case includes a PCB (printed circuit board). A plurality of devices are arranged on the protective case and connected to the PCB. The plurality of devices include a battery, a socket configured to accommodate a wireless communication device, a data connector, a wireless communication module, and a control module. The control module is configured to control the battery to charge the electronic device and activate the wireless communication module to communicate with the electronic device through the data connector, if the data connector is in use. The control module also controls the wireless communication module to communicate with the wireless communication device if the wireless communication device is removed from the socket, and also controls the battery to supply power to the wireless communication device if the wireless communication device is inserted into the socket.

FIG. 1 illustrates an embodiment of a protective case 200. The protective case 200 includes a bottom side 201, two first side walls 202 which are oppositely arranged on the bottom side 201, a second side wall 203, and a third side wall 204 parallel to the second side wall 203. The bottom side 201, first side walls 202, second side wall 203, and third side wall 204 together define an accommodation space 205 for accommodating an electronic device 100. The third side wall 204 defines a headphone aperture 206 and a data line aperture 207, although one common aperture could be used for both.

The electronic device 100 includes a headphone port 101 and a data port 102.

The electronic device 100 can be a mobile phone, a tablet computer, or other portable device. When the electronic device 100 is accommodated in the accommodation space 205, the headphone port 101 is positioned to correspond to the headphone aperture 206 of the protective case 200 and the data port 102 is positioned to correspond to the data line aperture 207 of the protective case 200. The protective case 200 further includes a headphone connector 219 for connecting the headphone port 101 to the protective case 200 and a data connector 220 for connecting the data port 102 to the protective case 200.

Figure 2:
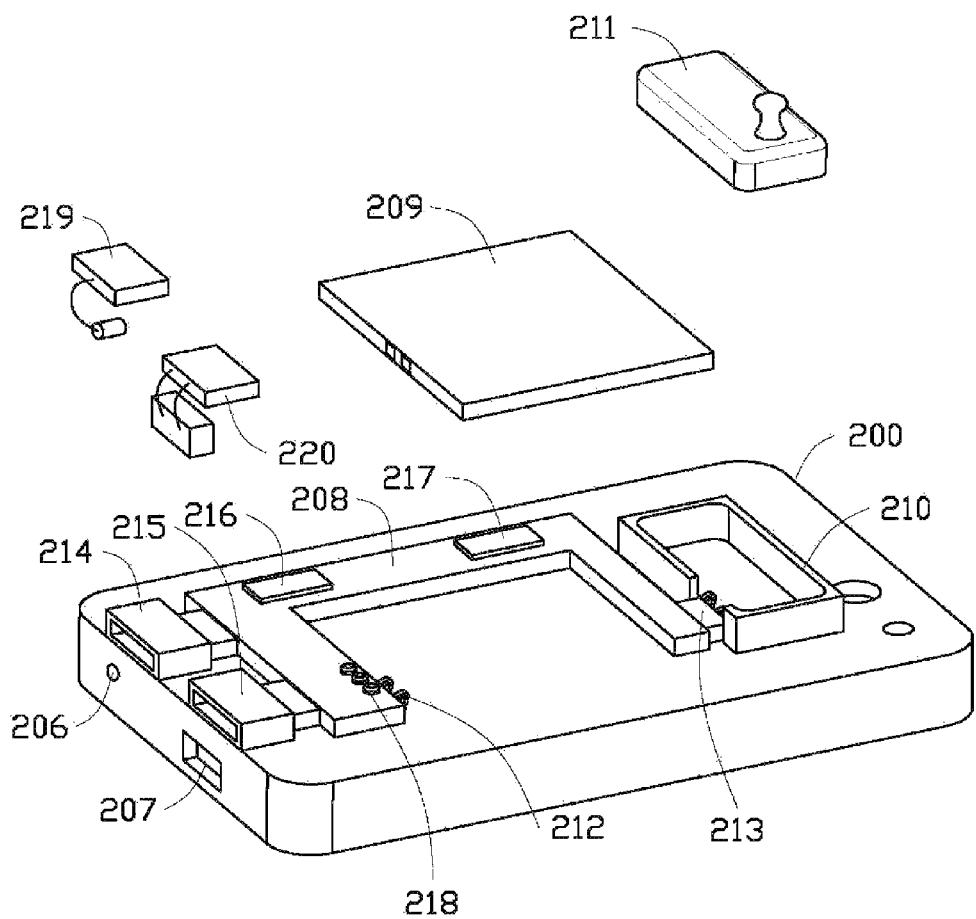
FIG. 2 is an exploded view of the protective case of FIG. 1.
Figure 3:
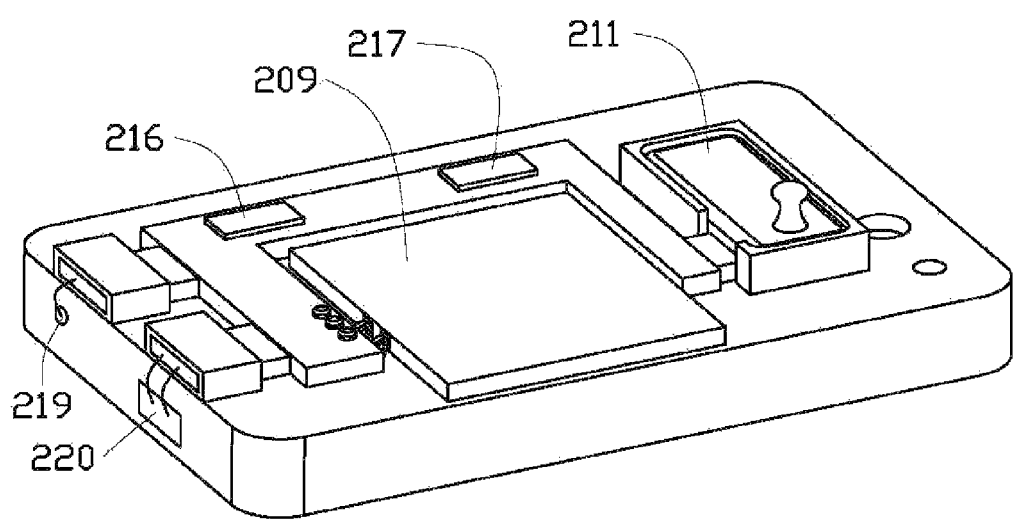
FIG. 3 is an assembled view of the protective case of FIG. 1.

Referring to FIGS. 2-3, a PCB 208, a battery 209, and a socket 210 for accommodating a wireless communication device 211 are arranged on a back surface of the bottom side 201. The battery 209 is electrically connected to the PCB 208 through at least one first metal connector 212. When the wireless communication device 211 is inserted into the socket 210, the wireless communication device 211 is electrically connected to the PCB 208 through at least one second metal connector 213. In at least one embodiment, the wireless communication device 211 can be a BLUETOOTH™ headphone (i.e., an earpiece). A headphone interface 214 and a data interface 215 are also arranged on the back surface of the bottom side 201 and both are connected to the PCB 208. When the electronic device 100 is accommodated in the accommodation space 205, one end of the headphone connector 219 passes through the headphone aperture 206 for insertion into the headphone port 101. The other end of the headphone connector 219 can be inserted into the headphone interface 214, to connect the headphone port 101 to the PCB 208. At the same time, one end of the data connector 220 passes through the data line aperture 207 for insertion into the data port 102. The other end of the data connector 220 can be inserted into the data interface 215, to connect the data port 102 to the PCB 208.

A control module 216, a wireless communication module 217 and at least one indicator 218 (such as a sequence of lights) are arranged on the PCB 208. The indicator 218 shows remaining electrical power of the battery 209. If the data connector 220 is connecting the data port 102 to the data interface 215 and the headphone port 101 is not connected to the headphone interface 214 by the headphone connector 219, the control module 216 controls the battery 209 to charge the electronic device 100 and activates the wireless communication module 217. In at least one embodiment, the wireless communication module 217 can be a BLUETOOTH™ module, and the control module 216 further controls the wireless communication module 217 to establish a connection to the electronic device 100 through the data connector 220. If the headphone connector 219 is connecting the headphone port 101 to the headphone interface 214, the control module 216 controls the wireless communication module 217 to connect to the electronic device 100 through the headphone connector 219. The battery 209 continues charging the electronic device 100 through the data connector 220. In an alternative embodiment, if a headphone (not shown) is connected to the electronic device 100 through the headphone port 101, the wireless communication module 217 is disconnected to the electronic device 100 and feeds back a signal to the control module 216. The control module 216 then shuts down the wireless communication module 217.

The control module 216 further determines whether the wireless communication device 211 is removed from the socket 210, based on a feedback signal generated by the second metal connector 213 or a sensor (not shown) arranged in the socket 210. If the control module 216 determines that the wireless communication device 211 has been removed, the control module 216 controls the wireless communication module 217 to communicate with the wireless communication device 211. If the control module 216 determines that the wireless communication device 211 has been inserted into the socket 210, the control module 216 disconnects the wireless communication module 217 from the wireless communication device 211 and controls the battery 209 to charge the wireless communication device 211. When communication between the wireless communication device 211 and the wireless communication module 217 is prevented, the electronic device 100 can activate an output device such as a loudspeaker.

The embodiments shown and described above are only examples. Many details are often found in the art such as the other features of a protective case. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A protective case for accommodating an electronic device, comprising:
   a PCB arranged on the protective case;
   a plurality of devices arranged on the protective case and connected to the PCB, wherein the plurality of devices comprising:
   a battery;
   a socket configured to accommodate a wireless communication device;
   a data connector configured to connect the PCB to a data interface of the electronic device;
   a wireless communication module; and
   a control module, configured to:
   control the battery to charge the electronic device and activate the wireless communication module to connect to the electronic device through the data connector, if the data connector contacts the data interface to the PCB;
   control the wireless communication module to communicate with the wireless communication device if the wireless communication device is moved out form the socket; and
   control the battery to charge the wireless communication device if the wireless communication device is inserted into the socket.

2. The protective case of claim 1, wherein the plurality of devices further comprises a headphone connector configured to connect the PCB to a headphone interface of the electronic device, the control module further controls the wireless communication module to connect to the electronic device through the headphone connector and controls the battery to continue charging the electronic device through the data connector if the headphone connector contacts the PCB to the headphone interface.

3. The protective case of claim 1, wherein the control module further controls to disconnect the communication between the wireless communication module and the wireless communication device if the wireless communication device is inserted into the socket.

4. The protective case of claim 3, wherein the wireless communication module is a BLUETOOTH™ module, and the wireless communication device is a BLUETOOTH™ headphone.

5. The protective case of claim 3, further comprising at least one metal connector, the battery charging the wireless communication device through the metal connector if the wireless communication device is inserted into the socket.

6. The protective case of claim 5, wherein the control module determines that the wireless communication device is inserted into the socket based on a feedback signal generated by the metal connector.

7. The protective case of claim 1, further comprising at least one indicator, and the indicator showing remaining electricity capacity of the battery.

8. A protective case for accommodating an electronic device, the electronic device having a headphone port and a data port, the protective case comprising:
   a battery;
   a wireless communication module;
   a socket configured to support a wireless communication device;
   a data interface configured to electrically couple to the data port;
   a headphone interface configured to electrically couple to the headphone port;

a PCB on the protective case configured to electrically couple to the battery, socket, wireless communication module, data interface and headphone interface and wireless communication device;

wherein when the data interface is electrically coupled to the data port, the battery charges the electronic device;

wherein when the wireless communication device is not mounted in the socket, the wireless communication module communicates with the wireless communication device;

wherein when the wireless communication device is mounted in the socket, the wireless communication module disconnects to the wireless communication device, and the battery charges the wireless communication device.

\* \* \* \* \*